Mar. 3, 1925.
F. J. STRAUB
1,528,582
PALLET FOR BLOCK MAKING MACHINES
Filed May 27, 1924
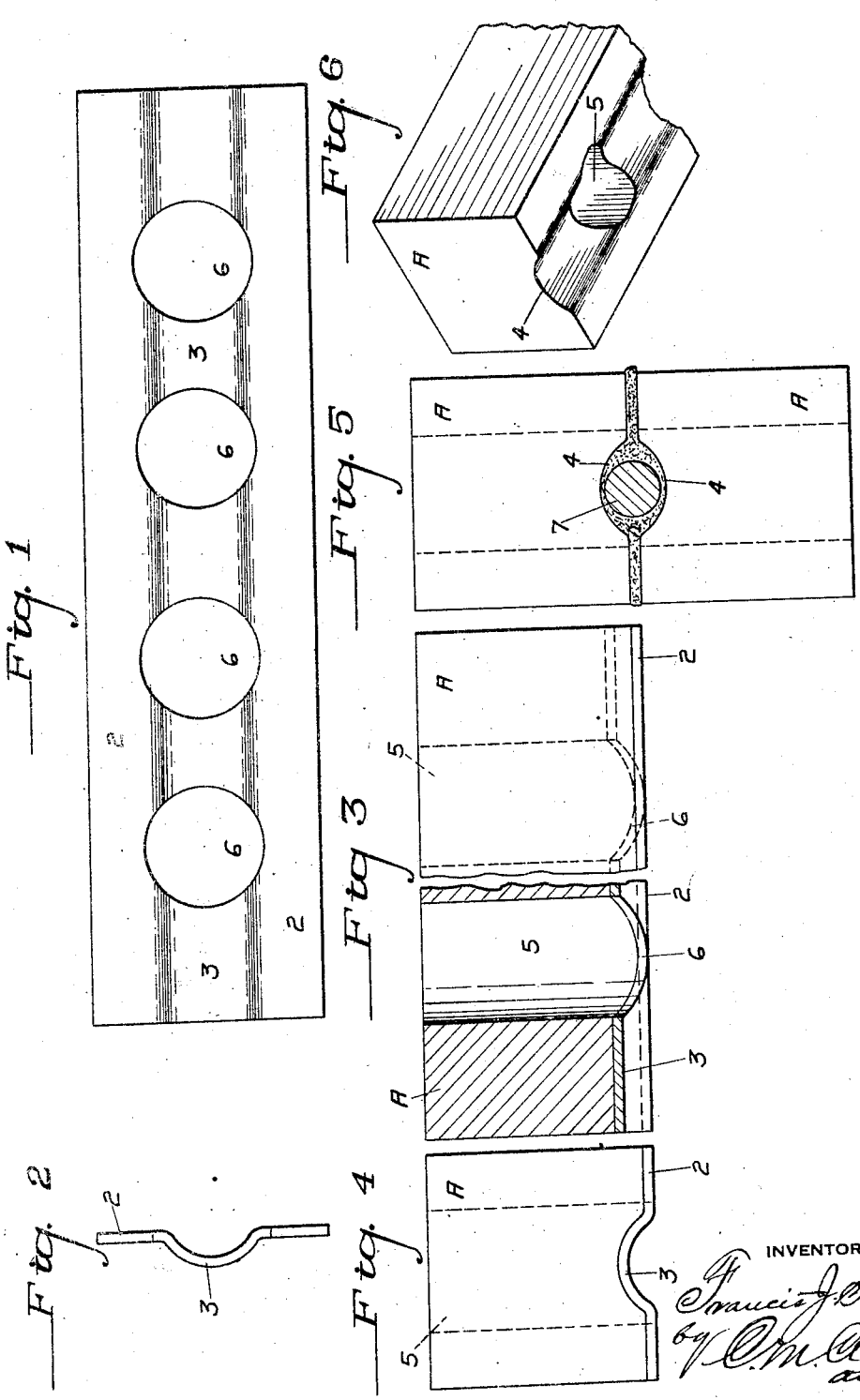

Patented Mar. 3, 1925.

1,528,582

UNITED STATES PATENT OFFICE.

FRANCIS J. STRAUB, OF NEW KENSINGTON, PENNSYLVANIA.

PALLET FOR BLOCK-MAKING MACHINES.

Application filed May 27, 1924. Serial No. 716,171.

*To all whom it may concern:*

Be it known that I, FRANCIS J. STRAUB, a citizen of the United States, residing at New Kensington, in the county of Westmoreland and State of Pennsylvania, have invented certain new and useful Improvements in Pallets for Block-Making Machines, of which the following is a specification.

My invention relates to the manufacture of building or other blocks, and particularly to an improvement in pallets used in connection with the pressing and transporting of the blocks.

In this art, it is customary to form the block of any suitable mixture, as concrete, clay, cinder, etc., within a suitably shaped mold by pressure, either with or without a core, and to support the block upon a bottom plate or pallet which is utilized as a support for transporting it to any suitable point for drying or further handling.

The present invention has in view to provide a pallet having an upwardly projecting central rib adapted to form a corresponding groove on the under face of the block, which rib greatly increases the stability of the pallet to prevent it from bending under the weight of the block when carried, and permits the use of comparatively thin sheet metal, thereby greatly reducing its weight.

Ordinarily, pallets for molding blocks have been made of continuously flat cast metal, but these are objectionable on account of their weight, and involve considerable additional labor in the work of carrying away large number of molded blocks each provided with its supporting heavy cast iron pallet. On the other hand, if cast iron pallets are made sufficiently thin for lightness, they frequently break under the load or in handling, and are a constant source of expense.

My invention is designed to overcome these various objections, and also to provide means for forming a central longitudinal groove upon the under face of the molded block and adapting it to more efficient usefulness when set in place in the manner hereinafter described, A further object is to provide, in a pallet of such construction, a plurality of centrally arranged core openings whereby corresponding transverse cores or holes may be made in the finished block in the operation of molding.

The present invention is somewhat similar to that of my prior Patent No. 1,486,056, issued March 4, 1924.

In the drawings, showing one preferred embodiment of the invention:

Fig. 1 is a plan view of the pallet;

Fig. 2 is an end view;

Fig. 3 is a side view, partly in section and partly broken away, showing the pallet in supporting position under the block;

Fig. 4 is an end view of Fig. 3;

Fig. 5 is an end view of two blocks laid one on the other, with an intervening reinforcing bar; and Fig. 6 is a perspective view of one of the molded blocks.

Referring to the drawings, the simplest form of pallet illustrated in Fig. 1 is a rectangular piece of comparatively thin sheet metal 2, provided throughout its length and centrally of it width with a pressed up ridge 3 adapted to form the resulting groove 4 in the molded block A. Said block, as shown in Fig. 3, is supported upon the pallet 2 within the cavity of a suitable mold and provided with the usual plunger bottom, upwardly above which the pallet is supported in the usual way. The formation of the mold for whatever material is used is one familiar to those skilled in the art, and need not be described.

When the block has been sufficiently pressed and molded to shape, and removed from the mold, it may be lifted by the workmen grasping each end of the supporting pallet and carried away to any drying position, as is ordinarily done. The presence of the rib 3 extending upwardly through the middle portion of the pallet greatly stiffens it against buckling, enabling the use of a comparatively thin section of sheet metal, as steel, and the resulting block is provided with the longitudinally formed groove, as shown.

For the purpose of providing molded openings 5 at intervals through the block A, the pallet is perforated with a series of similar holes 6, either round, square, or of other shape, centrally of the plate and of ridge 3, as shown. The pallet as thus made is comparatively narrow, say four inches, and especially adapted to the making of half width blocks of standard length, say sixteen inches.

An especial advantage in the ridge 3 is that it not only forms the deep approximately semi-cylindrical opening 4 along the middle of the bottom of the block, but by its under side, provides a good opening for insertion of the fingers at each end, for carrying by the workmen.

One resulting advantage in the molded block is that, when two blocks are placed together with their bottom grooves confronting, as in Fig. 5, ample space is provided for insertion of a reinforcing bar 7, with surrounding clearance for mortar or cement. In this manner, with the usual overlap or break joint longitudinally, a very strong and rigid wall may be laid up of the narrow or half width blocks, with resulting economy.

The presence of the deep longitudinal groove running from end to end of the bottom of the block, when laid with a suitable binder on the opposite flat face of an adjacent block, also ensures a strong rigid anchoring connection, when used without any metal reinforcement, as will be obvious.

The construction and manner of operation of the invention will be readily understood and appreciated from the foregoing description. It greatly simplifies and cheapens the ordinary pallet while increasing its efficiency and reducing its weight. The resulting advantage of the grooved block greatly adds to the stability of the wall or other structure in which it is used, and the invention materially contributes to the efficiency of the workmen in molding the blocks, while reducing their labor as to the aggregate weight to be carried throughout an entire day's work.

What I claim is:

1. A molding pallet made of comparatively thin sheet metal and provided with an upwardly extending longitudinal groove forming rib throughout its middle providing finger insertion openings at each end.

2. A molding pallet made of comparatively thin sheet metal and provided with an upwardly extending longitudinal groove forming rib throughout its middle providing finger insertion openings at each end, and having a series of centrally arranged transverse core openings.

In testimony whereof I hereunto affix my signature.

FRANCIS J. STRAUB.